United States Patent
Claussen et al.

(10) Patent No.: US 10,500,640 B2
(45) Date of Patent: Dec. 10, 2019

(54) SYSTEMS AND METHODS OF VOLUMETRIC 3D PRINTING

(71) Applicant: SIEMENS ENERGY, INC., Orlando, FL (US)

(72) Inventors: Heiko Claussen, North Brunswick, NJ (US); Livio Dalloro, Plainsboro, NJ (US); Joshua S. McConkey, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 277 days.

(21) Appl. No.: 15/446,275

(22) Filed: Mar. 1, 2017

(65) Prior Publication Data

US 2018/0250890 A1   Sep. 6, 2018

(51) Int. Cl.
| | |
|---|---|
| *B33Y 10/00* | (2015.01) |
| *B22F 3/105* | (2006.01) |
| *B33Y 30/00* | (2015.01) |
| *B33Y 80/00* | (2015.01) |
| *B33Y 50/02* | (2015.01) |
| *B29K 105/00* | (2006.01) |

(52) U.S. Cl.
CPC ............ *B22F 3/1055* (2013.01); *B33Y 10/00* (2014.12); *B33Y 30/00* (2014.12); *B33Y 50/02* (2014.12); *B33Y 80/00* (2014.12); *B22F 2003/1056* (2013.01); *B22F 2003/1057* (2013.01); *B29K 2105/0055* (2013.01); *B29K 2105/0058* (2013.01); *B29K 2105/251* (2013.01)

(58) Field of Classification Search
CPC ......... B33Y 10/00; B33Y 30/00; B33Y 50/02; B33Y 80/00; B29C 64/386; B29C 64/106; B29C 64/135; B29C 64/165
USPC ....................................................... 264/401
See application file for complete search history.

(56) References Cited

U.S. PATENT DOCUMENTS

| | | |
|---|---|---|
| 2003/0154790 A1 | 8/2003 | Venturelli et al. |
| 2015/0273632 A1 | 10/2015 | Chen |
| 2016/0031156 A1 | 2/2016 | Harkness et al. |
| 2016/0067922 A1 | 3/2016 | Voris et al. |
| 2016/0271870 A1 | 9/2016 | Brown, Jr. |

OTHER PUBLICATIONS

PCT International Search Report and Written Opinion of International Searching Authority dated Apr. 30, 2018 corresponding to PCT International Application No. PCT/US2018/014853 filed Jan. 23, 2018.

*Primary Examiner* — Christina A Johnson
*Assistant Examiner* — Xue H Liu

(57) ABSTRACT

Systems and methods for volumetrically fabricating 3D objects. The system includes at least a controller operably connected to a build volume and one or more energy sources. The build volume defines a volumetric buildable size of the object to be fabricated and includes media for fabricating the object therein. The energy source(s) is configured to emit at least a first and second energy beam therefrom. The controller is configured to direct the first and second emitted energy beams towards an intersecting point in the build volume to begin fabricating the media therein. The energy from each of the first and second beams is not sufficient to fabricate the object out of the media. The object is fabricated once multiple beams intersect, as collectively, the energy of the intersecting beams is sufficient to fabricate the object.

11 Claims, 4 Drawing Sheets

1005 — preparing a build volume with the materials to be worked upon;

1010 — directing two or more energy sources towards the materials within the build volume 1015 — emitting energy from the energy sources towards a central point of the materials 1020 — steering or directing the emitted energy such that the emitted energies intersect within the build volume and moving the intersecting beams within the build volume to fabricate a part from inside out;

1025 — switching the energy sources from a write mode to a read mode, and emitting energy therefrom, such that the emitted energy transmits fabrication information regarding the materials being worked upon and/or or the part;

1030 — adjusting one or more of the energy sources based on the fabrication information to continue fabricating the part; and repeating the write and read process as needed until the part is fabricated.

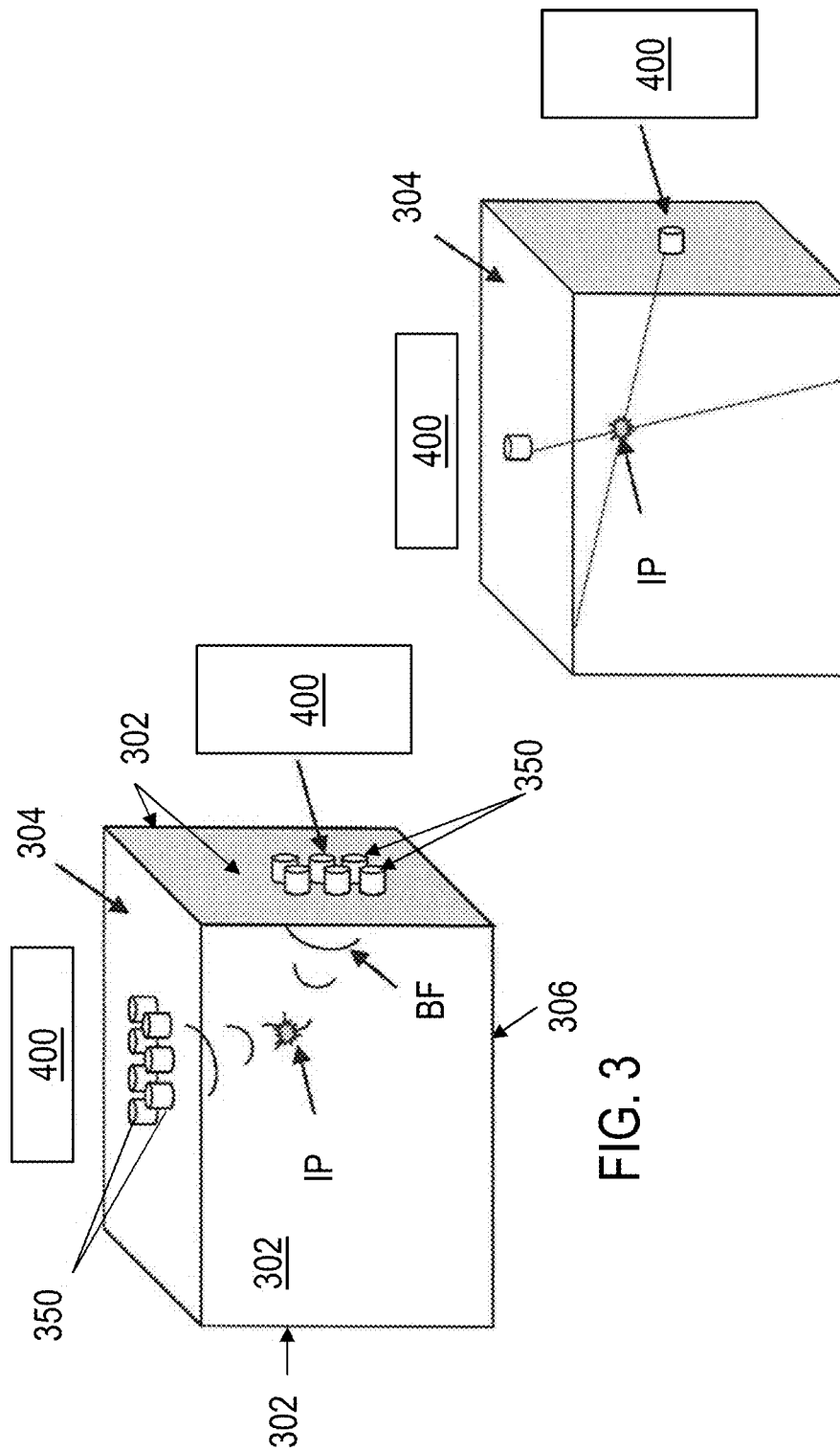

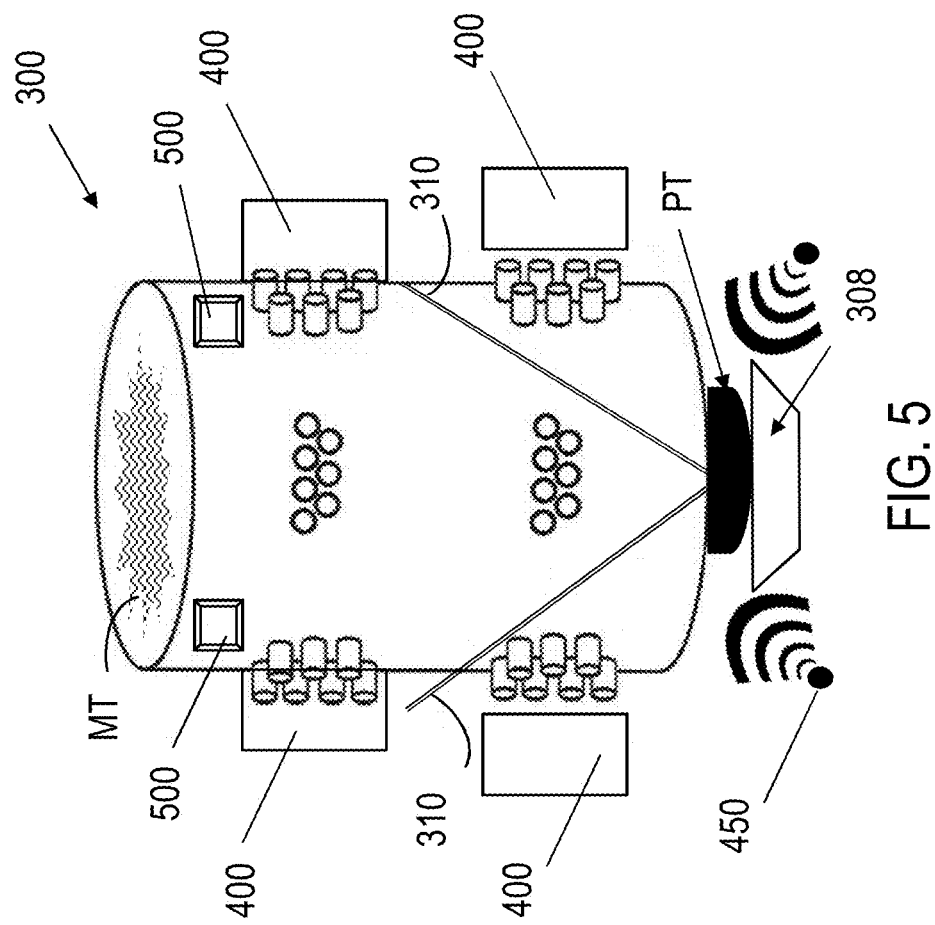

1005 — preparing a build volume with the materials to be worked upon;

1010 — directing two or more energy sources towards the materials within the build volume 1015 — emitting energy from the energy sources towards a central point of the materials 1020 — steering or directing the emitted energy such that the emitted energies intersect within the build volume and moving the intersecting beams within the build volume to fabricate a part from inside out;

1025 — switching the energy sources from a write mode to a read mode, and emitting energy therefrom, such that the emitted energy transmits fabrication information regarding the materials being worked upon and/or or the part;

1030 — adjusting one or more of the energy sources based on the fabrication information to continue fabricating the part; and repeating the write and read process as needed until the part is fabricated.

FIG. 6

SYSTEMS AND METHODS OF VOLUMETRIC 3D PRINTING

TECHNICAL FIELD

The present disclosure relates generally to additive manufacturing processes, and more particularly, to volumetric 3D printing systems and methods of using the same.

BACKGROUND

Additive manufacturing allows for fast prototyping without the need for molds or dies. Many types of additive manufacturing approaches exists, including stereo-lithography, fused deposition modeling, 3D printing, laser sintering and laser engineered net shaping. Additive manufacturing provides for low cost adaptations and construction of customized products and enables lightweight complex geometries that are potentially build from multiple materials. Each of these types of additive manufacturing methods requires buildup of materials either point by point or layer by layer.

While additive manufacturing has sometimes been considered to revolutionize the way products are constructed, this manufacturing method has not replaced traditional manufacturing methods because of the production time of each component using additive manufacturing. For example, after each layer is complete in any of the above types of additive manufacturing processes, an additional layer of, e.g., powder, is added so that the process may continue. Often these processes include a waiting period until the added material hardens before one can continue to the next layer. This approach is inherently slower than, e.g., traditional sintering or injection molding. This manufacturing speed deficiency directly translates into higher costs, low quantities, and thus, a limited market share.

One solution to the manufacturing speed deficiency is to provide numerous low cost 3D printers, which may allow for a larger number of individuals to directly produce the desired products. Another approach is to print multiple prototypes in one printer besides and on top of each other to maximize the printed material per layer and 3D printer. However, this approach is known to have increased wait times resulting from the necessity of hardening any materials, providing additional powder, and for cleanup.

SUMMARY

In one embodiment, a method for volumetrically fabricating a physical object is provided. The method may include the step of providing a build volume having materials for fabricating the object disposed therein. The method may further include the step of directing at least a first and second energy beam towards an intersecting point, e.g., a nugget, within the build volume. Upon the first and second beams intersecting, the object begins to materialize out of the materials. The first and second beams may be configured so that an individual beam is not sufficient enough to fabricate the object out of the materials, and instead, the first and second beams at the point of intersection collectively are sufficient enough to begin fabricating the object.

The method further includes the step of switching one or more of the energy sources from a write mode to a read mode, where the write mode is a mode for emitting beams to fabricate the object, and where the read mode is operable to scan an interior of the build volume, e.g., the materials and/or the object, to determine a progress or status of the object being worked upon. To determine status, e.g., the scanned information may include imagery or information related to the shape or features of the part being fabricated. The scanned information may then be transmitted to the controller or other device for adjusting one or more parameters of the energy sources to continue the fabricating process. The method may further include the step of supporting the fabricated object by one of a support structure or via acoustic levitation.

BRIEF DESCRIPTION OF THE DRAWINGS

FIG. 3 illustrates an exemplary embodiment of a build volume and energy source that may be utilized in the system of FIG. 1, and in accordance with the disclosure provided herein;

FIG. 4 illustrates another exemplary embodiment of a build volume and energy source that may be utilized in the system of FIG. 1, and in accordance with the disclosure provided herein;

FIG. 5 illustrates yet another exemplary embodiment of a build volume and energy source that may be utilized in the system of FIG. 1, and in accordance with the disclosure provided herein; and FIG. 6 illustrates a flowchart for an exemplary embodiment of a method of volumetrically fabricating a part, in accordance with the disclosure provided herein;

DETAILED DESCRIPTION

The components and materials described hereinafter as making up the various embodiments are intended to be illustrative and not restrictive. Many suitable components and materials that would perform the same or a similar function as the materials described herein are intended to be embraced within the scope of embodiments of the present invention.

In general, the computing systems and devices described herein may be assembled by a number of computing components and circuitry such as, for example, one or more processors (e.g., Intel®, AMD®, Samsung®) in communication with memory or other storage medium. The memory may be Random Access Memory (RAM), flashable or non-flashable Read Only Memory (ROM), hard disk drives, flash drives, or any other types of memory known to persons of ordinary skill in the art and having storing capabilities. The computing systems and devices may also utilize cloud computing technologies to facilitate several functions, e.g., storage capabilities, executing program instruction, etc. The computing systems and devices may further include one or more communication components such as, for example, one or more network interface cards (NIC) or circuitry having analogous functionality, one or more one way or multi-directional ports (e.g., bi-directional auxiliary port, universal serial bus (USB) port, etc.), in addition to other hardware and software necessary to implement wired communication with other devices. The communication components may further include wireless transmitters, a receiver (or an integrated transceiver) that may be coupled to broadcasting hardware of the sorts to implement wireless communication within the system, for example, an infrared transceiver, Bluetooth transceiver, or any other wireless communication know to persons of ordinary skill in the art and useful for facilitating the transfer of information.

Figure 1:
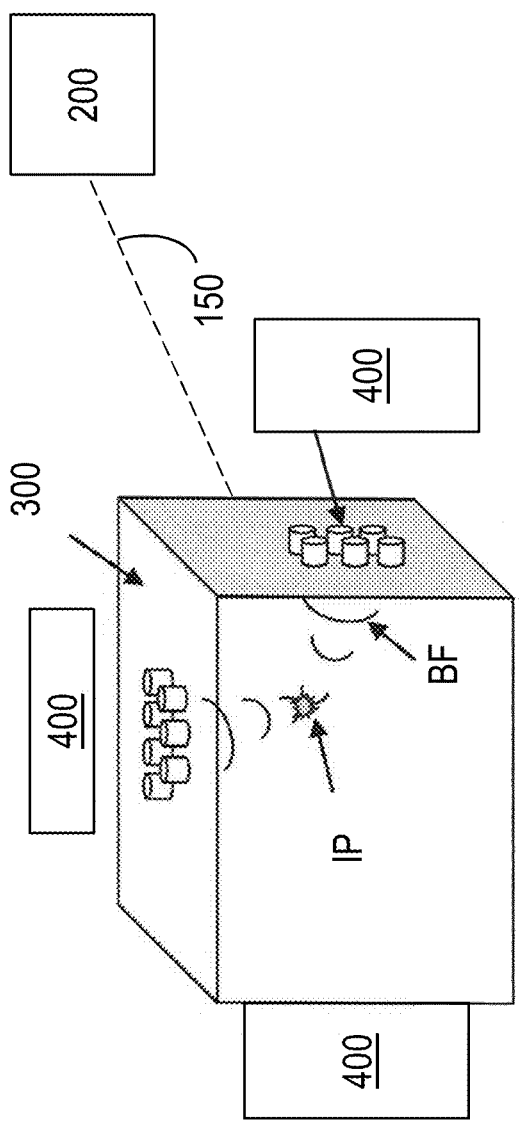
FIG. 1 illustrates a block diagram of an embodiment of a system for volumetric 3D printing an object, in accordance with the disclosure provided herein.

Referring now to the drawings wherein the showings are for purposes of illustrating embodiments of the subject matter herein only and not for limiting the same, FIG. 1 illustrates a block diagram of an embodiment of a system 100 for volumetric 3D printing an object. The system 100 may include one or more controllers 200 operably connected, via a wired or wireless communication link 150, to one or more devices within the system 100, e.g., one or more build volumes 300 and/or energy sources 400 for operably controlling the energy sources 400 to modify and/or create objects from materials within the build volume 300. The inventors' novel 3D printing processes may be used to fabricate out of the materials in the build volume, 3D physical objects and parts, whose topologies and geometries may be typically described via 3D digital models, e.g., created via computer-aided design (CAD) technologies.

Figure 2:
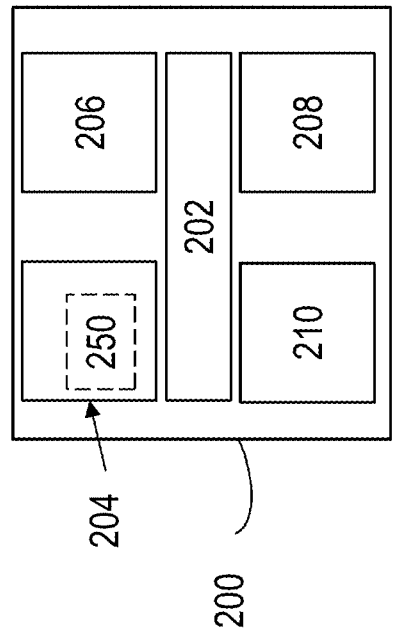
FIG. 2 illustrates an exemplary embodiment of a controller that may be utilized in the system of FIG. 1, and in accordance with the disclosure provided herein.

With continued reference to the figures, and now FIG. 2, the controller 200 may include at least a processor 202 operably connected to a memory 204 for executing one or more instructions or commands of a control application 250 stored in the memory 204, or other data storage component 206 operably connected to the processor 202, e.g., a hard disk drive, solid-state drive etc. It should be appreciated that the control application 250 may include instructions for controlling one or more of the devices of the system 100, e.g., the energy sources 400 and any energy emitted therefrom for facilitating the fabrication process. The controller 200 may further include a user interface 208, which may be any general interface for receiving user input and generating a displayable output on a display (not shown). The controller 200 may also include a network adapter/transceiver 210 to facilitate communication between the controller 200 and other devices of the system 100.

With continued reference to the figures, and now FIGS. 3 through 5, the build volume 300 may be full or partial enclosure or container designed to at least partially contain a suitable amount of materials or media MT therein and which defines a volume representative of, e.g., a maximum buildable size of an object or part (not shown) to be fabricated/manufactured. That is, the representative defined volume should be such that upon completion of the fabrication process, the build volume 300 may contain the fabricated object. The materials MT may include, e.g., aluminum, steel, high nickel alloys, and other harsh environment and/or temperature resistant metals, as well as ceramic and glass materials, depending on the part or object to be fabricated.

In one exemplary embodiment, as shown in FIGS. 3 and 4, the build volume 300 may have a cuboid shape formed from, e.g., four or more faces or side panels. FIG. 3 illustrates an embodiment of the build volume with four side walls 302, and at least a top panel 304 and a base panel 306.

Additionally or alternatively, the build volume 300 may include a platform, pedestal or similar member 308 to be use with or in place of the base panel 406 to suspend the materials within the volume, e.g., a nugget or other structure, for forming the printed part therefrom. In this embodiment, it should be appreciated that the control application 250 may include instructions for controlling rotational or other movement (e.g., vibratory movement) of the platform, e.g., during the fabrication process. Additionally or alternatively, two or more wires 310, cords or similar constructs may be extend through the build volume or situated, e.g., removably or permanently fastened, within the build volume for suspending, e.g., the nugget or portions of printed objet in the build volume.

In yet a further embodiment, the printed object or materials forming the part may be suspended or contained within the build volume 300 via acoustic or sound wave levitation. Acoustic levitation is the process of using sound, or more particular, properties of sound, e.g., waves or vibrations, to float solids, liquids, and gases, e.g., heavy gases. The waves may be transmitted and/or directed towards the materials MT or part PT via one or more acoustic or levitation devices 450, e.g., ultrasound device, acoustic transmitters, speakers or the like. The device(s) 450 may be operably connected to the controller 200, under the control of the control application 250, for directing and controlling, e.g., the focal point of the sound wave towards the materials or part for levitating or securing the same during the fabrication process, or for transporting the part PT upon completion of the process.

It should be appreciated that the floating materials may be confined to an area within the build volume 300, or to a defined printing area (not shown) in an embodiment where no build volume 300 is provided, where the emitted energies may then be directed for intersecting and working upon the materials. Suspending, or holding in place, portions of the printed part or materials for forming the part via acoustic levitation enables the construction or fabrication of objects having a volume which may exceed the defined volume of the build volume. It should also be appreciated that any combination of the base, platform, wires, levitation device, or compressed air may be used for suspending the part or any materials forming the part at least partially within the build volume 300.

With continue reference to the figures, the cuboid build volume 300, or one or more of the panels or walls may be comprised of a transparent or translucent material for allowing any emitted energy to pass therethrough for constructing the object within the build volume 300. Additionally or alternatively, the top 304 and base panel 306 may be constructed from the same or similar materials as the side panels for allowing energy to pass therethrough.

With reference to FIG. 5, the build volume 300 may comprise a cylindrical or spherical shape. It should be appreciated that a cylindrical or spherical shape may provide for rotational symmetry of the build volume 300. Similar to the cuboid, the cylindrical or spherical build volume may be comprised of transparent or translucent materials such that emitted energy from the energy source 400 may be transmitted therethrough and onto materials within the build volume 300. It should further be appreciated that the build volume may be comprised of any polygonal shape, e.g., a triangular shape, or other hybrid shape that includes at least one panel, e.g., flat side, attached to a semi-circular panel to form at least a partial enclosure of the build volume 300, thus resulting in at least portions of the build volume with an arcuate profile.

Additionally or alternatively, the build volume may include a support object situated therein. The support object may be coupled to any of the panels of the build volume to assist in preventing the printed article, e.g., the physical object, from shifting, e.g., floating up or sinking down, during fabrication of the physical object. Examples of the support object may include a lever, rod, or similar member extending, e.g., from an inner portion of one or more panels toward the physical object. The levers may be hinged within the build volume such and moveable during the fabrication process to provide support throughout. It should be appreciated that the support object may be made from materials resistant to the energies generated within the build volume, e.g., heat, so not to interfere with the materials being worked upon during the fabrication process. Examples of such materials not susceptible to the acoustic thermal or laser heating energies may be certain metals or high temperature ceramics. Additionally or alternatively, portions of the support object, e.g., those portions engaging the printed article, may include a protective material to protect the printed article from any damage, e.g., surface damage, which may result from the support object.

Additionally or alternatively, in yet a further embodiment, the support object/structure may be a temporary structure comprised of materials that may be reduced during the fabrication process. In this embodiment, a reduction of the material may be based on evaporation using multiple intersecting lasers at a high power output. In this embodiment, support structures may be created first for the printing of future printed regions, and then later destroyed via the evaporation process so that the structures or at least a portion of the support structure no longer remains.

In an embodiment where the build volume includes liquid materials, the support object should be situated such that it prevents the printed object from changing position, e.g., preventing it from floating or sinking, during the fabrication process. Additionally or alternatively, as disclosed herein, a support for the fabricated part and/or materials within any embodiment of the build volume 300 may be provided via acoustic levitation. It should further be appreciated that a combination of the support structures described herein may be utilized supporting the materials and/or printed object. For example, acoustic levitation may be used with, e.g., the lever, for supporting the printed object within the build volume.

With continued reference to the figures, any embodiment of the build volume 300 may include one or more guides 350 permanently or selectively attached thereto for facilitating the transmission of the emitted energy to the materials of the build volume 300. In the embodiment of FIG. 3, a plurality of guides 350, e.g., wave guides, may be included or integrated into the build volumes between the energy emitters and the materials within the build volume. In one exemplary embodiment, the guides 350 may extend toward the materials within the build volume via one or more openings (not shown) in any of the panels 302 or walls of the build volume 300, which provides access to the materials within the build volume 300. It should be appreciated that the guides 350 may be sized such that they may be extended at least partially through the openings in the panels for providing access to the materials. The guides 350 may be attached to the build volume 300, e.g., by welding or any other fastening and connecting means known in the art, or in yet a further embodiment, the guides may be integrally formed with the one or more panels. Additionally or alternatively, the guides 350 may be moveable from a first position within the build volume 300 to a second position at least partially extending through the walls of the build volume 300. The controller 200, under the control of the control application, may cause the moveable guides 350 to extend and retract as required by the fabrication process to assist in guiding the emitted energy towards the materials within the build volume 300.

Additionally or alternatively, the build volume 300 may further include a transparent window or interface. In this embodiment, e.g., the guides may be selectively attached to build volume and situated over the transparent window or interface of any panel for providing access to the materials therein. It should be appreciated, where the energy source is an acoustic energy sources, the transparent window may have an acoustic impedance matching or similar to the acoustic impedance of any materials disposed within the build volume or the guides, or of the energy source.

With continued reference to the figures, the energy source 400 may be an array of acoustic emitters (FIG. 3) or a laser energy source (FIG. 4). The energy source 400 may be independently configured or adjusted, e.g., via the controller 200 and under the control of the control application 250, to control the energy emitted therefrom during the fabrication process.

FIG. 3 illustrates an embodiment where the energy source 400 includes a plurality of acoustic emitters, In this exemplary embodiment, each panel, or a subset of the panels, may include small acoustic sources positioned next to each other in a substantially uniform manner to cover at least a portion of the panel or the entire panel for emitting energy into the build volume 300. It should be appreciated, that each energy source 400, e.g., each acoustic emitter, may be aligned with a corresponding guide 350 for guiding any emitted energy towards the materials within the build volume 300.

The plurality of energy sources 400 positioned next to each other form a grouping of energy sources. Multiple groupings of energy sources may be arranged uniformly around the build volume, e.g., equidistantly apart from a next grouping of energy sources. Each of the acoustic sources may be powered and controlled independently from one another, e.g., via the controller 200, in terms of power and frequency. The intensity of the acoustic sources around the outer surfaces of the build volume 300 may also be controlled, via the controller 200, in real-time such that it creates, e.g., focal interference patterns along a 3D shape of the volume that the process intends to create.

Adjustments of the energy source may include, e.g., adjusting, e.g., a phase, amplitude and/or frequency of the acoustic energy emitted therefrom. In one embodiment, the array of acoustic emitters may be a coordinated phased array emitter capable of beam steering and beam forming BF (FIG. 3). An adjustment of one or more of the phase, amplitude and frequency of the acoustic emitters may allow for steering or guiding of the acoustic energy within the build volume 300 for creating the object.

The adjustment should be such that energy emitted from a single energy source 400 may not be sufficient to act upon the materials in the build volume to create the object therein, i.e., the printed part. Instead, it should be appreciated that the energy emitted from multiple energy sources, e.g., two or more energy sources, may be required to begin constructing the object within the build volume at an intersecting point IP where energy emitted from the energy sources intersect. That is, the point where the emitted energies intersect IP creates sufficient energy to begin working upon the materials during the fabrication process to print the object.

With continued reference to the figures, in an embodiment where the energy source 400 may be a laser energy source, the laser energy emitted therefrom may be continuous, e.g., a continuous laser beam, or pulsed. In this embodiment, and similar to the acoustic energy embodiment, the energy emitted from a single laser energy source 400, e.g., an energy beam, may not be suffice to work upon the materials within the build volume, and instead, the energy generated at the intersecting point IP from multiple energy sources 400, may be required to work upon the materials for fabricating an object within the build volume 300. It should be appreciated, in yet a further exemplary embodiment, a combination of different energy sources 400 may be utilized during the fabrication process for creating the object.

In yet a further embodiment, a single energy source 400 may be operably configured to function in a manner as two or more energy sources. That is, a single energy source may be configured to emit multiple beams towards the materials within the build volume for fabricating the part. In this embodiment, the materials may be worked upon only when the multiple beams intersect. That is, a single emitted beam would not be sufficient to melt the materials. Instead, multiple intersecting beams from a single energy source 400 may be required to melt the materials for forming the part.

Additionally or alternatively, any embodiment of the energy source 400 may be integrated into the build volume 300, or selectively attached to an outer portion of the build volume and situated such that the emitted energy may be directed to the materials within the build volume, e.g., a nugget defining the initial point of fabrication.

A nugget, as used herein, may describe the focal build point where the article to be manufactures begins. In one embodiment, the nugget may be a cluster of the materials to be worked upon that is selectively place or deposited within the build volume, or which forms at the point where the emitted energy intersects. Additionally or alternatively, the nugget may be identified via the controller, e.g., under the control of the control application, as the materials at the initial point of intersection of the emitted energies, i.e., the initial point where multiple beams intersect and where the part begins to grow out of the materials. Additionally, or alternatively, the nugget may be an object or other structure particular to the object being fabricated. For example, in one exemplary embodiment, the nugget may be a processor, e.g., a silicon based processing circuit. In this embodiment, the nugget may be lowered into the build volume via one or more openings in the top of the build volume using a gripper (not shown) or similar tool. Upon lowering the nugget, a surface of the nugget may be heated via the intersecting emitted energy beams to grow a structure from the nugget.

Additionally or alternatively, the system 100 may include a means for replenishing materials MT within the build volume 300. The means for replenishing the materials MT may be an external device, container, or similar construct containing the materials MT and operably connected to the build volume 300, e.g., via one or more tubes or inlets adapted and sized to feed the materials MT to the printing area, e.g., within the build volume 300. The means for replenishing the materials may be controlled, e.g., via the controller 200 under the control of the control application 250 which may include instructions for controlling the flow of materials MT being transferred from the container to the print area. Additionally or alternatively, the replenishing source or container may be situated within the build volume 300 and outside the printing area, and be constructed of materials not to substantially interfere with any materials being worked upon for fabricating the part.

With continued reference to the figures, the system 100 may further include a means for circulating the powdered materials within the build volume 300 or the printing area. The means for circulating the powdered materials may be an air jet stream (not shown) or similar device operable to enhance and focus the circulation of the powdered materials within the build volume 300.

With continued reference to the figures, and now FIG. 6, a method 1000 for volumetric 3D printing is provided. In an exemplary embodiment of the method 1000, the build volume is filled with materials to be worked upon (1005). It should be appreciated that embodiments of the build volume which includes one or more guides, the one or more guides may also include the same or similar materials to the materials within the build volume. The materials of the guides may have the same or a similar acoustic impedance to the materials within the build volume so that no reflection results during the fabrication operation. For example, in an embodiment where the build volume comprises aluminum powdered materials, the guide may be filled with iron or steel powdered materials because steel is known to have a higher melting point than that of aluminum. It should further be appreciated that the size of the materials within the guides, e.g., steel powdered materials, may be reduced relative to the size of the materials within the build volume. Additionally, a higher energy density may be obtained in the guide 350 based on the guide materials being more temperature resistant than the materials MT within the build volume 300.

With continued reference to the figures, the materials may include, e.g., a liquid, resin or powdered material that may be hardened through specific types/spectra of radiation, e.g., heat, ultraviolet light, etc. It should be appreciated that embodiments using acoustic energy, liquid filler materials may enable better wave propagation. The materials may comprise, e.g., metals, alloys, and polymers, which may be in a solid phase at room temperature and which, upon exposure to controlled high temperatures, changes into liquid phase (e.g., a melt).

Additionally or alternatively, the build volume 300 may be filled with a gas, i.e., gases may be used with or in place of the materials, e.g., powdered material, within the build volume 300. Types of gases may include, e.g., helium, argon, nitrogen.

Once the build volume is prepared for the fabrication process, i.e., contains the materials MT to be worked upon, the energy source 400 may be directed towards the material MT within the build volume 300, or more particularly, the print area (1010). Thereafter any energy emitted from the energy source 400 may be directed onto a central point, e.g., the nugget within the build volume, which may also be a central point of the object/part to be fabricated (1015). The materials within the build volume are worked upon once the emitted energy from two or more energy sources intersect. That is, the emitted beams are steered and directed to intersect within the build volume to begin printing the part from the materials (1020). In this embodiment, directing or steering the emitted energy towards the central point allows for the part to fabricated inside out, e.g., from the inside surfaces to the outer surfaces, or vice versa where appropriate. Where the emitted energy intersects, the intersecting point IP may be rastered such that one or more voxels may be formed from the hardened or sintered material (e.g., powder, liquid, resin, or gas) resulting in a solid printed product.

In an embodiment where the printed material is dissolved in the gas or liquid, e.g., at a molecular level, the laser energy emitted may be used to create hot spots where one aims to grow the printed material. The printed material may be dissolved, e.g., in the halogen and supplied to the printed area. The lasers may be used to create hot spots at the area where material needs to be added. The hot spots may result in the separation of the dissolved material from the halogen so it will attach itself to the heated material. The material may be grown in a very fine and controlled way. When using a fine powder rather than the molecular dissolved material, the surface may be heated to the point where the powder particles sinter to the surface point of interest. It should be appreciated the powdered materials within the build volume 300 may continuously hover, e.g., in a printing area like a dust cloud, during the fabrication process.

As discussed, each energy source 400 should be configured such that the emitted energy from a single source is not sufficient to work, e.g., melt, the materials within the build volume to the construct final part. As used herein, not sufficient means that the single emitted energy has only a limited or no effect on the base material. Additionally, the material has to allow a sufficient propagation depth of the emitted energy.

Fabricating the part in this manner, instead of the conventional layer-by-layer process, allows for the materials within the volume to grow, i.e., be constructed, in, e.g., complex 3D surface contours, which may be positioned according to the iso-surfaces of the volume of the part. The product/part resulting from this process results in products with higher resistance to stress because it follows the topology of the part volume. It should be appreciated that by realizing the fabrication from the inner parts of the volumes to the outer parts, the process reduces the need for Computer Aided Manufacturing (CAM) phase escape routes for any powder that is not solidified as part of the final part, but needs to be removed from the final product. Escape routes are used, e.g., in powder based additive manufacturing to remove the excess material after the fabrication is completed. Additionally, the outer surfaces of the part fabricated in accordance with the inventors' disclosure herein will have a higher quality because the iso-surfaces align to the geometries of the outer surfaces of the part.

With continue reference to the figures, additionally or alternatively, the method 1000 may further include switching the energy source from a write mode to a read mode, e.g., during the fabrication process (1025). For example, in an embodiment where the energy sources are acoustic arrays, one or more or each of the acoustic arrays may be operable in a write mode or a read mode. The write mode may be the constructive interference of sound which temporarily melts the powder in the build volume, which solidifies into the desired shape. The read mode may include a reflective or transverse reading of much lower power acoustic signals that may be generated by the arrays and read by the same or different arrays on the outer surface of the cylinder. In this exemplary embodiment, and because the acoustic path lengths of interest may change during the write mode, as the intervening and reflecting materials change properties from, e.g., powder to solid, stopping the write mode and beginning the read mode after a pre-determined period of time, allows for characterizing the real time acoustic 3D environment inside the build volume. This characterization would subsequently be transmitted back to, e.g., the controller 200, energy source 400 or other device operably configured for controlling/driving the arrays. Upon receiving the characterization, i.e., the read information, the device driving the arrays may be adjusted to more accurately control the writing beams, e.g., acoustic beams (1030).

Additionally or alternatively, a camera 500 (FIG. 5), video recorder, or similar device may be provided within the system 100, e.g., within the build volume 300 or operably connected thereto, for providing real time feedback during the fabrication process. In this embodiment, e.g., where the energy source 400 is a laser energy source, the camera 500 may provide information on how light may be propagating through the filed, and based on this information, adjustments may be made to the emitted energy properties, e.g., intensity and/or depth of the electromagnetic beam, to more accurately controlling the writing beams.

In yet a further embodiment, the method 1000 may comprise the step of forming one or more cavities in the printed object to allow for excess material not cured during the fabrication process to escape. Additionally, or alternatively, the method 1000 may further include applying a solvent to assist with removing excess material or residue. For example, in an embodiment where a fine water resistant powder is the base material, water may be inserted in any cavities and, e.g., solution of the fine particles may be created in the water and applied, e.g., via an ultrasonic mixer. The solution may then be washed out of the printed object and the surface cavity may be closed. By letting the solution settle or by filtration, any remaining material may be recovered.

It should be appreciated that the inventors have now developed a means by which any object may be printed volumetrically, rather than slice-by-slice as in known 3D printing technologies. Printing times of devices and objects, in accordance with the disclosure provided herein, will be many times faster. It should further be appreciated that many subsequent interference patters may have to be created to heat and melt all the points in the build volume that need to become solid. When creating interference patterns, in accordance with the embodiments disclosed herein, multiple heat points can be generated at the same time, resulting in a faster coverage of the entire build volume, where needed. Thus, within the same interference pattern, multiple points in the volume can be melted into solid at the same time.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the terms "comprising", "including", and "having", are open-ended and does not exclude other elements or steps; and the use of articles "a" or "an" does not exclude a plurality.

We claim:

1. A 3D volumetric printing system comprising:
a build volume (300) representative of a buildable size of an object to be fabricated and including media therein for fabricating the object;
a controller (200) operably connected to one or more energy sources (400) and configured to cause the one or more energy sources to emit at least a first and a second energy towards an intersecting point in the media such that the first and second emitted energies are collectively sufficient to fabricate the object from the media, wherein at least one of the energy sources is operable in a read mode, and wherein upon activating the read mode, the read mode energy source is configured to scan an interior of the build volume to determine a status of the object being fabricated, and wherein the controller is configured to adjust one or more parameters of the one or more energy sources based on the determined status to continue fabricating the object.

2. The system of claim 1, wherein the first and second emitted energies are from a single energy source.

3. The system of claim 1, wherein the one or more energy sources are one or more of a plurality of phased array acoustic transducers or laser energy sources.

4. The system of claim 1 further comprising:
one or more guides (350) extending from the build volume and arranged between the one or more energy sources and the media within the build volume.

5. The system of claim 4, wherein the energy sources are a plurality of phased-array acoustic transducers, and wherein the one or more guides includes media having the same or similar acoustic impedance to the media within the build volume.

6. The system of claim 1 further comprising:
a camera (500) operably connected to the build volume and controller for scanning at least an interior of the build volume to determine a status of the fabricated object, and adjusting one or more parameters of the one or more energy sources based on the determined status to continue fabricating the object.

7. The system of claim 1 further comprising:
a means for replenishing media within the build volume operably connected to the build volume and the controller.

8. The system of claim 7, wherein the means for replenishing is a storage device operably connected to the build volume via one or more feeding lines, wherein the storage device includes the same or similar media to the media within the build volume, and wherein the means for replenishing the media directs the same or similar media from the storage device to a defined print area of the build volume.

9. The system of claim 1 further comprising:
a means for circulating the media within the build volume operably connected to the build volume and the controller, wherein the means for circulating the material circulates the media in a defined print area of the build volume.

10. The system of claim 1, wherein the build volume is representative of a maximum buildable size of the object.

11. The system of claim 1, wherein the build volume comprises one of a cuboid shape, a cylindrical shape, or spherical shape.

* * * * *